United States Patent
Charzinski et al.

(10) Patent No.: US 8,174,979 B2
(45) Date of Patent: May 8, 2012

(54) METHOD AND DEVICE FOR CONTROLLING ACCESS TO A COMMUNICATIONS NETWORK

(75) Inventors: Joachim Charzinski, Oberschleissheim (DE); Thomas Engel, Unterbiberg (DE); Christian Prehofer, Munich (DE); Rainer Sauerwein, Herrsching (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 12/058,415

(22) Filed: Mar. 28, 2008

(65) Prior Publication Data
US 2008/0247418 A1 Oct. 9, 2008

Related U.S. Application Data

(63) Continuation of application No. 10/181,554, filed on Jul. 19, 2002, now abandoned.

(30) Foreign Application Priority Data

Jan. 21, 2000 (EP) .................................. 00101182

(51) Int. Cl.
*H04J 1/16* (2006.01)
*H04J 3/16* (2006.01)
(52) U.S. Cl. ......... 370/235; 370/252; 370/400; 370/465
(58) Field of Classification Search .................. 370/235, 370/252, 400, 465
See application file for complete search history.

(56) References Cited

U.S. PATENT DOCUMENTS

| 5,570,410 | A | * | 10/1996 | Hooshiari | 379/32.03 |
| 5,687,167 | A | * | 11/1997 | Bertin et al. | 370/254 |
| 5,805,072 | A | * | 9/1998 | Kakemizu | 370/408 |
| 5,867,494 | A | | 2/1999 | Krishnaswamy et al. | 370/352 |
| 5,884,043 | A | | 3/1999 | Teplitsky | 709/238 |
| 5,953,338 | A | * | 9/1999 | Ma et al. | 370/395.21 |
| 5,982,748 | A | * | 11/1999 | Yin et al. | 370/232 |
| 6,021,113 | A | * | 2/2000 | Doshi et al. | 370/228 |
| 6,118,791 | A | * | 9/2000 | Fichou et al. | 370/468 |

(Continued)

FOREIGN PATENT DOCUMENTS

EP 0 957 648 A2 11/1999

(Continued)

OTHER PUBLICATIONS

T. Engel et al., "An effective method for distributed call admission in integrated voice/data IP networks", Siemens AG, Sep. 1999.

(Continued)

*Primary Examiner* — Andrew Lee
(74) *Attorney, Agent, or Firm* — Laurence A. Greenberg; Werner H. Stemer; Ralph E. Locher

(57) ABSTRACT

According to the invention, in order to control the access of traffic streams (VS) to the communications network (KN), an available capacity (VK), placed at the disposal of an access node (ZK) for transferring traffic streams (VS) to said communications network (KN), is determined from an access node (ZK) of the communications network (KN), taking into account the total transfer capacity (G) of the communications network (KN). The available capacity (VS) is notably redetermined whenever the routing information (RI) of the access node (ZK) is modified. An access control of this type guarantees the quality of service required in a connectionless communications network.

9 Claims, 1 Drawing Sheet

U.S. PATENT DOCUMENTS

| | | | |
|---|---|---|---|
| 6,130,875 A * | 10/2000 | Doshi et al. | 370/225 |
| 6,144,661 A * | 11/2000 | Katsube et al. | 370/390 |
| 6,215,768 B1 * | 4/2001 | Kim | 370/230 |
| 6,314,103 B1 | 11/2001 | Medhat et al. | 370/395.2 |
| 6,529,475 B1 | 3/2003 | Wan et al. | 370/231 |

FOREIGN PATENT DOCUMENTS

| | | |
|---|---|---|
| GB | 2 322 514 A | 8/1998 |

OTHER PUBLICATIONS

A. Iwata et al., "PNNI routing algorithms for multimedia ATM internet", NEC Res. & Develop., vol. 38, No. 1, Jan. 1997.

"A provider Architecture for Differentiated Services and Traffic Engineering" by Li et al. Oct. 1998.

* cited by examiner

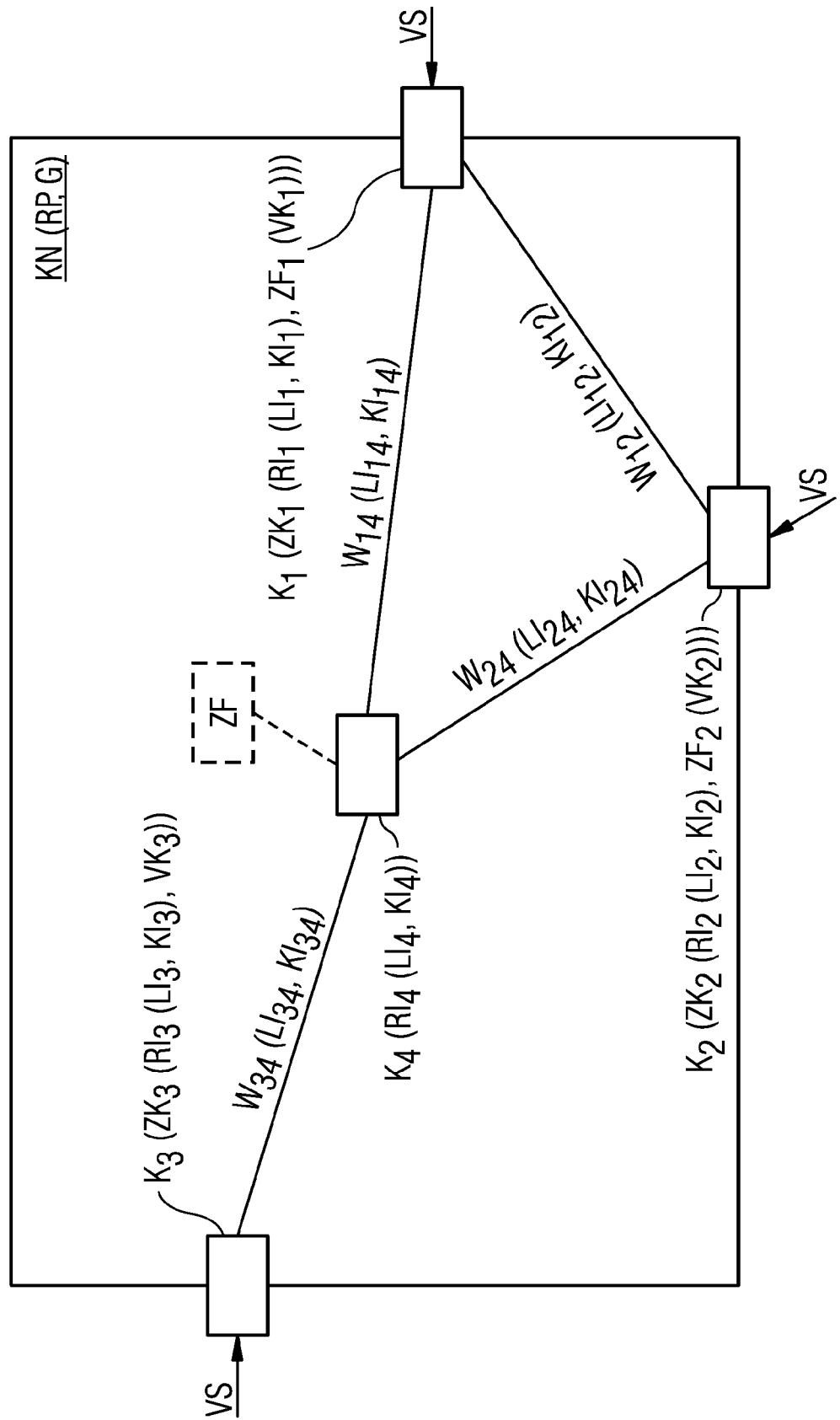

ND DEVICE FOR CONTROLLING
METHOD AND DEVICE FOR CONTROLLING ACCESS TO A COMMUNICATIONS NETWORK

CLAIM FOR PRIORITY

This patent application is a continuation of U.S. application Ser. No. 10/181,554, filed on Jul. 19, 2002, which claims priority to EP Application No. 00101182.4 filed on Jan. 21, 2000 the entire disclosure of which is incorporated herein by reference.

TECHNICAL FIELD OF THE INVENTION

The invention relates to a method and apparatus for access control for a communications network.

BACKGROUND OF THE INVENTION

Modern packet-oriented communications networks—also referred to as "data networks"—have been designed essentially for the transmission of packet streams, which are also referred to in the specialist world as "data packet streams". There is normally no requirement for a guaranteed transmission quality of service. The data packet streams are thus transmitted, for example, with fluctuating time delays, since the individual data packets of the data packet streams are normally transmitted in the sequence of their access to the network, e.g. the time delays become greater the greater the number of packets that have to be transmitted by a data network. In the specialist world, the transmission of data is therefore also referred to as a transmission service without realtime conditions, or as a "non-realtime service".

In the course of the convergence of line-oriented speech and packet-oriented data networks, realtime services, e.g. transmission services in realtime conditions, such as the transmission of speech information or moving picture information, are likewise increasingly being provided in packet-oriented communications networks. That is, the transmission of the realtime services which, until now have normally been transmitted on a line-oriented basis is being carried out on a packet-oriented basis, e.g. in packet streams, in a convergent speech/data network. These packet streams are also referred to as "realtime packet streams". One problem that arises in this case is that a high quality of service is required for packet-oriented transmission whose quality is comparable to that of line-oriented transmission. In particular, a minimal delay—for example of <200 ms—without any fluctuations in the delay time is important, since realtime services in general require a continuous information flow, and any loss of information, for example due to packet losses, cannot be compensated for by repeated transmission of the packets that have been lost. Since, in principle, these quality of service requirements apply to all communications networks using packet-oriented transmission, they are independent of the specific configuration of a packet-oriented communications network. Consequently, the packets may be in the form of Internet, X.25 or frame-relay packets, or else may be in the form of ATM cells. Packet data streams and realtime packet data streams are in this case exemplary embodiments of traffic streams that are transmitted in communications networks.

Speech and picture information should normally be transmitted in a speech/data network with a guaranteed quality of service, in order that the quality of the speech and picture transmission is not decreased when the number of packets to be transmitted in the Internet rises. In the IETF (Internet Engineering Task Force), proposals relating to this have been made in Blake et. al., "An Architecture for Differentiated Services", RFC 2475, 1998, ftp://venera.isi.edu/in-notes/rfc2475.txt and in Nichols et. al, "Definition of the Differentiated Services Field (DS Field) in the IPv4 and IPv6 Headers", RFC 2474, 1998, ftp://venera.isi.edu/in-notes/rfc2474.txt, for a number of service classes to be introduced in the packet-oriented Internet, which until now has not guaranteed qualities of service. An Internet such as this is also referred to as a 'DiffServ network'. In this case, the individual packet streams are in each case allocated to a specific service class and, depending on their service class, are transmitted with or without priority with respect to packets in other service classes by the transmission nodes in the Internet. It is thus possible, by way of example, to ensure the quality of service required for realtime services by allocating the associated realtime packet streams to a service class which is transmitted with priority by the nodes in the Internet—with the realtime packet streams thus being given priority over the data packet streams.

The formation of a class for prioritized transmission results in the formation of a (virtual) separate communications network within the Internet, for transmission of high-priority traffic streams and with a separate overall transmission capacity, which comprises a portion of the overall transmission capacity of the Internet. The overall transmission capacity of a communications network which comprises transmission nodes and paths is regarded as that capacity which is required for transmission of the traffic streams which can be transmitted without any loss of traffic. That is, no further traffic stream could be transmitted in that communications network without loss of traffic. The transmission capacity which is still available on a predetermined route between two transmission nodes in the communications network accordingly depends not only on the traffic which is being transmitted directly between these two transmission nodes, but also on that traffic which is being transmitted at least partially along the given route as a consequence of transmission along other routes in the communications network.

In principle, network access control is required, at least for the prioritized traffic, for priority-controlled transmission, since the required quality of service can be ensured only if the communications network is not supplied with any more prioritized packets than the maximum number which it can transmit. For this purpose, network access devices—also referred to as 'edge devices' or else, from the point of view of the communications network, as 'access nodes'—have been proposed for the Internet with a number of service classes, and which are used to provide network access control. In this case, the edge devices can

- control the volume of the traffic supplied in the form of packet streams to the communications network;
- set priority tags in the packets in accordance with the priority of their packet streams;
- control and if necessary correct priority tags for packet streams, if the packets have already been tagged with priorities; and
- control the transmission capacity of prioritized packet streams.

The transmission nodes, which are known as edge devices, and paths in the communications network are also referred to as "domains", with which the edge device is associated. One edge device may also be associated with a number of domains.

A fixed threshold value, which the traffic volume should not exceed, is normally set in the edge devices in order to control the traffic which is supplied to the communications network. This method is very simple, but is inflexible with regard to changes in the overall transmission capacity of the communications network.

SUMMARY OF THE INVENTION

The invention discloses a method of improving controlling access to a communications network.

One embodiment of the invention is access control, provided by an access node in the communications network, for traffic streams to a communications network as a function of an available capacity which is available to the access node for transmission of traffic streams to the communications network. The value of this available capacity, which is available to the access node for the transmission of traffic streams to the communications network, is determined for at least the access node by an access function, taking into account the overall transmission capacity of the communications network, and this is reported to the access node. The invention has a number of advantages:

- The access control can be flexibly matched to changes in the overall transmission capacity.
- This communications network avoids being supplied with more traffic than can be transmitted when its overall transmission capacity is considerably reduced.
- At least partial loss of traffic streams is avoided.
- Since the access control is provided by the access node, no direct knowledge of the traffic streams that are being supplied is required in the other transmission nodes in the communications network. This is associated with the advantage that the invention can be used in connectionless communications networks, for example in the Internet.

According to another embodiment of the invention, the invention provides that the available capacity is determined whenever the overall transmission capacity changes. The access control is thus adapted when changes occur in the communications network. In particular, the direct adaptation of the 'available capacity' threshold value minimizes the time period in which the threshold value may not be matched to the changed overall transmission capacity.

According to still another embodiment of the invention, in the case of a communications network having a number of transmission nodes and paths, the available capacity is determined, at least partially, as a function of information which is available to the access node for routing in the communications network. According to one aspect of the invention, the information is in the form of load information and/or cost information which characterizes the transmission paths. This has the advantage that the overall transmission capacity of the communications network is taken into account by means of information which is normally stored in realtime access nodes—for example in the edge devices of a DiffServ network.

In yet another embodiment of the invention, in the case of a communications network having a number of transmission nodes and paths, whose overall transmission capacity depends at least on the transmission capacities of the transmission paths, any change in the overall transmission capacity is identified as a consequence of a change in the transmission capacity of one of the transmission paths. One aspect of the invention provides that the change in the transmission capacity of one of the transmission paths is reported to the access node in accordance with the rules of a routing protocol. Changes such as these are normally reported by the most realtime routing protocols. The invention can thus advantageously be used in a large number of communications networks, without any adaptation to the routing protocol.

In another aspect of the invention, the access function is provided in the access node and determines the capacity which is available for this access node. The access control is thus provided by that access node, that is to say without any involvement of the other transmission nodes in the communications network. The functionality of the access node is thus maintained even if significant portions of the communications network have failed.

BRIEF DESCRIPTION OF THE DRAWINGS

The invention will be explained in more detail in the following text with reference to FIG. 1, which illustrates a block diagram of a communications network.

DETAILED DESCRIPTION OF THE PREFERRED EMBODIMENTS

FIG. 1 shows, by way of example, a block diagram of a communications network KN with an overall transmission capacity G, in which a routing protocol RP is used for the transmission of routing information RI. The communications network KN has four transmission nodes K, of which the first transmission node $K_1$ forms a first access node $ZK_1$, the second transmission node $K_2$ forms a second access node $ZK_2$, and the third transmission node $K_3$ forms a third access node $ZK_3$. Traffic streams VS are transmitted from each of the access nodes ZK to the communications network KN.

The transmission nodes are connected to one another by means of four transmission paths, $W_{12}$, $W_{14}$, $W_{24}$ and $W_{34}$, with the indices indicating those transmission nodes $K_i$ and $K_j$ between which the transmission path $W_{ij}$ is provided. The transmission capacity of each of the transmission paths is assumed to be identified, for example, by load information LI and/or cost information KI.

Routing information RI, which, for example, includes the load information LI and/or cost information KI about the transmission paths W, is stored in each of the transmission nodes. Furthermore, a decentralized, access-node-specific access function ZF is provided in each of the access nodes $ZK_1$ and $ZK_2$. The access functions ZF in each case determine a capacity VK which is available for the associated access node ZK, and report this to the node. Alternatively, a central implementation of the access function ZK is indicated, which is physically accessed via the transmission node $K_4$. This is used, for example, for determining the capacity $VK_3$ which is available for that access node $K_3$, and this is reported thereto in a corresponding manner, with its value being stored in the access node $ZK_3$.

The access function ZF may, for example, be implemented centrally or in a decentralized manner. For the exemplary embodiment, it is assumed that the access function ZF is implemented on an access-node-specific basis, that is to say in a decentralized manner. An access function ZF implemented in this way normally has no global information available to it about the traffic streams VS which are currently being transmitted in the communications network KN. The capacity VK which is available for the associated access node ZK is therefore determined, for example, on the basis of locally available information, from which conclusions are drawn about the current distribution of the traffic streams between the transmission nodes K and transmission paths W in the communications network KN. In the case of an access-node-specific implementation of the access function ZF, the determined available capacity VK is reported from there to the access node ZK by the determined value being stored, for example, in a storage medium in the access node ZK. In the case of a central implementation of the access function ZF, the determined value is reported to the access node, for example with at least one information item which is transmitted to the access node ZK and is, for example, in the form of a packet.

An embodiment of the invention in which the available capacity VK is determined once again in each case, when the routing information RI is adjusted, is associated with particularly significant advantages. For example, the routing information RI is normally adapted by the access node ZK whenever the transmission capacity of one of the transmission paths W in the communications network KN has changed.

By way of example, the routing information RI is changed in accordance with the rules of a routing protocol RP which is used in the communications network KN. The object of the routing protocol RP is in this case to match the routes in the communications network KN to changed conditions in the communications network KN. This will be explained briefly using the example of a connectionless packet-oriented communications network KN for example an Internet: A so-called 'routing table' for determining the next transmission node K for an incoming packet is produced in each transmission node K on the basis of the topology of the communications network KN. The next transmission node K is determined in the table, on the basis of the destination address of the packet. Since the routing tables are normally synchronized throughout the network by means of the routing protocol RP, each packet generally reaches its destination.

A failure of a transmission path W is reported to the transmission nodes K in the communications network KN in accordance with the rules of the routing protocol RP. These transmission nodes K then normally form adapted routing tables.

Examples of routing protocols are OSPF (Open Shortest Path First), RIP (Routing Information Protocol) or IS-IS (Intermediate System to Intermediate System). Each of the routing protocols RP normally provides an access node ZK with different information about the communications network KN. For example, the routing information RI which is available to an access node ZK depends on which routing protocol RP is being used. In the simplest case, the topology of the communications network is reported. Routes with a specific metric (for example the number of transmission nodes K on a route) are determined by the access nodes ZK on the basis of this routing information. However, other information, such as the capacity of the transmission paths W, cost information KI or load information LI, may also be reported.

An access node ZK can thus carry out the access control for traffic streams VS to the communications network KN on the basis of different criteria. The capacities which are required for the transmission of the traffic streams VS that are supplied from the access node ZK to the communications network KN are normally added for this purpose, and are compared with the available capacity VK. The total required capacities should normally not exceed the available capacity VK. In this case, the available capacity is also referred to as the 'limit' or 'bandwidth limit'. A specific traffic stream VSi is in this case generally either allowed—that is to say transmitted—or is rejected. The access node ZK takes into account, for example, information about the topology of the communications network KN, about the transmission capacities of the transmission paths W in the communications network KN, or about typical load situations in the communications network KN. Depending on the detail in which the communications network KN is considered on the basis of the available routing information RI, there are various possible ways to determine the available capacity VK for the transmission of traffic streams VS:

1. Pro rata limit VK for the accumulated required capacities of all the traffic streams VS which are being transmitted from an access node ZK to the communications network KN.
2. In each case one bandwidth limit VK for each route to other transmission nodes K in the communications network KN.
3. In each case one bandwidth limit VK for each individual transmission path W in the communications network KN, along which at least one route runs.

These limits VK normally in each case apply for the traffic via one access node ZK when the access function ZF is implemented in a decentralized manner. When the access function ZF is implemented centrally, the limits could also be checked globally.

According to one embodiment of the invention, which is associated with particularly significant advantages, the access control is adapted on the basis of the information which is reported via the routing protocol RP. If the status of the communications network KN changes, for example in the event of changes to the paths in the communications network KN as a result of a failure of a transmission path W or a change in the load situation of a transmission path W, or else a change in the capacity of a path (for example in the case of ATM, ISDN), the access control for the access node ZK is thus adapted in an appropriate manner immediately, by determining the available capacity VK. For the three scenarios stated, in case of a failure of a transmission path W—for example the transmission path $W_{24}$ and a corresponding redetermination of the routes, this adaptation is carried out, by way of example, by determining new bandwidth limits:

1. The access node ZK includes a predefined table (or calculation formula) for determining a new limit VK. The new limit VK is taken from the table, taking into account the available transmission paths W.
2. The access function ZF recalculates the bandwidth limits VK for all the routes by reallocation of the available capacity VK of the access node ZK. The transmission capacity of the routes which no longer exist should, for example, be regarded as having been lost. If the new routes overlap old routes, then the previous contingents should be redistributed between the routes. If, for example, the transmission path $W_{24}$ fails, the new route from the transmission node $K_2$ to the transmission node $K_3$ passes via the transmission node $K_1$. Since this new route now overlaps the route to the transmission node $K_1$, the available capacity VK for these two routes is redistributed, for example, as follows: if 100 traffic streams VS were originally allowed for each of the two routes, then, for example, 50 traffic streams VS will be allowed for each route after the redistribution.
3. In principle, there should be no need to recalculate the bandwidth limits VK for individual transmission paths W. Since it is normally necessary to change the routes in the communications network KN when transmission paths W fail, a check should be carried out to determine whether any additional routes are running along the individual transmission paths W. In this case, adaptation of the bandwidth limits VK would generally be necessary. In the above example, 100 traffic streams VS were allowed on the transmission path $W_{12}$ before failure of the transmission path $W_{24}$. After the failure, it is necessary to take into account the fact that additional routes will run along the transmission path $W_{12}$.

In the event of changes in the communications network KN, the recalculation of the access function ZF may show that more traffic streams are being transmitted to the communications network KN than would be permissible on the basis of the recalculated available capacity VK. If the maximum number of connections in the network is exceeded as a consequence of this, this results in an overload, and a partial loss of traffic. The transmission of some of the traffic streams VS is thus terminated on the basis of the recalculation. In principle, two variants are envisaged for this purpose:

1. The transmission of a number of traffic streams VS is terminated immediately, so that the remaining traffic streams VS are not affected by the overload.
2. One transmission after the other is slowly terminated, thus waiting to see whether some of the traffic streams VS terminate themselves as a consequence of the overload.

Any decision between the two variants depends, for example, on the speed with which the access node ZK and the traffic streams VS react or can react. The second variant is preferred, in the case of doubt, on the basis of the following consideration: many applications normally use at least two associated traffic streams VS, which typically run in opposite directions (so-called bi-directional connections). If, in this case, one of the traffic streams VS is terminated, the application normally also terminates the associated second traffic stream VS, with a certain time delay.

Finally, it should be stressed that the invention can be used in any desired communications network KN. For example, application is envisaged in:

long-distance traffic communications networks KN, such as the Internet, local communications networks KN—also referred to as local area networks or LANs, virtual communications networks KN, for example those referred to as a virtual private network or else VPN, or the initially described prioritized sub-network of a Diff-Serv network.

The invention claimed is:

1. A method for controlling access to a communications network, comprising:
    determining for at least one access node an available capacity, which is available to the access node for the transmission of traffic streams to the communications network, by an access function, taking into account the overall transmission capacity of the communications network;
    reporting the available capacity to the access node; and
    controlling, by the access node, the access of traffic streams to the communications network as a function of the available capacity, so that no knowledge of the traffic streams that are being supplied is required in the other transmission nodes in the communications network.

2. The method as claimed in claim 1, wherein the available capacity is determined when the overall transmission capacity changes.

3. The method as claimed in claim 1, wherein in the case of a communications network having a number of transmission nodes and paths, the available capacity is determined as a function of information which is available to the access node for routing in the communications network.

4. The method as claimed in claim 3, wherein the information is in the form of load information and/or cost information which characterizes the transmission paths.

5. The method as claimed in claim 1, wherein in the case of a communications network having a number of transmission nodes and paths, whose overall transmission capacity depends on the transmission capacities of the transmission paths, any change in the overall transmission capacity is identified as a consequence of a change in the transmission capacity of one of the transmission paths.

6. The method as claimed in claim 5, wherein the change in the transmission capacity of one of the transmission paths is reported to the access node in accordance with the rules of a routing protocol.

7. The method as claimed in claim 1, wherein the access function is provided in the access node and determines the capacity which is available for this access node.

8. A communications network operating in a connectionless manner, the communications network comprising:
    transmission nodes connected to one another by means of transmission paths, with at least one transmission node forming an access node;
    an access function capable of determining the capacity available for the at least one access node for the transmission of traffic streams to the communications network, taking into account the overall transmission capacity of the communications network;
    wherein, when the overall transmission capacity of the communications network changes:
    the access function determines for the at least one access node an available capacity available to the access node for the transmission of traffic streams to the communications network, taking into account the overall transmission capacity of the communications network;
    the access function reports the available capacity to the access node; and
    the access node controls the access of traffic streams to the communications network as a function of the available capacity, so that no knowledge of the traffic streams that are being supplied is required in the other transmission nodes in the communications network.

9. A network node configured to act as an access node in a communications network that comprises:
    transmission nodes connected to one another by means of transmission paths, with at least one transmission node forming an access node;
    an access function capable of determining the capacity available for the at least one access node for the transmission of traffic streams to the communications network, taking into account the overall transmission capacity of the communications network;
    wherein, when the overall transmission capacity of the communications network changes:
    the access function determines for the at least one access node an available capacity available to the access node for the transmission of traffic streams to the communications network, taking into account the overall transmission capacity of the communications network;
    the access function reports the available capacity to the access node; and
    the access node controls the access of traffic streams to the communications network as a function of the available capacity, so that no knowledge of the traffic streams that are being supplied is required in the other transmission nodes in the communications network.

* * * * *